United States Patent
Toal et al.

(10) Patent No.: US 12,298,889 B1
(45) Date of Patent: May 13, 2025

(54) VALIDATION AND TESTING OF A SEQUENCE OF MULTIPLE APPLICATIONS

(71) Applicant: American Express Travel Related Services Company, Inc., New York, NY (US)

(72) Inventors: Jonathan R. Toal, Toronto (CA); Joshua J. Motter, Phoenix, AZ (US); Ripan Kapoor, Delhi (IN); Marcos Diclei Silva Barros, Sunrise, FL (US); Jaspal Singh Virk, Phoenix, AZ (US); Vikas Malhotra, Gurgaon (IN); Praveen Sharma, Phoenix, AZ (US); Anurag Rohilla, Rohtak (IN)

(73) Assignee: American Express Travel Related Services Company, Inc., New York, NY (US)

( * ) Notice: Subject to any disclaimer, the term of this patent is extended or adjusted under 35 U.S.C. 154(b) by 323 days.

(21) Appl. No.: 17/521,995

(22) Filed: Nov. 9, 2021

(51) Int. Cl.
  *G06F 11/36* (2006.01)
  *G06F 3/14* (2006.01)
  *G06F 11/3668* (2025.01)
  *H04L 51/046* (2022.01)
  *H04L 51/42* (2022.01)

(52) U.S. Cl.
  CPC ............ *G06F 11/3664* (2013.01); *G06F 3/14* (2013.01); *G06F 11/3684* (2013.01); *G06F 11/3688* (2013.01); *G06F 11/3692* (2013.01); *H04L 51/046* (2013.01); *H04L 51/42* (2022.05)

(58) Field of Classification Search
  CPC ............ G06F 11/3664; G06F 11/3684; G06F 11/3688; G06F 11/3692; G06F 3/14; H04L 51/42; H04L 51/046
  See application file for complete search history.

(56) References Cited

U.S. PATENT DOCUMENTS

| | | | |
|---|---|---|---|
| 8,166,347 B2 * | 4/2012 | Kirtkow | G06F 11/3684 714/38.14 |
| 11,099,237 B2 | 8/2021 | Nochilur et al. | |
| 11,301,368 B1 * | 4/2022 | Chavan | G06F 11/076 |

(Continued)

OTHER PUBLICATIONS

Arguelles, Carlos, et al. "Critical User Journey Test Coverage." (2020). (Year: 2020).*

*Primary Examiner* — Geoffrey R St Leger
(74) *Attorney, Agent, or Firm* — Sterne, Kessler, Goldstein & Fox P.L.L.C.

(57) ABSTRACT

Disclosed herein are system, method, and computer program product embodiments for validation and testing of a sequence of multiple applications. A developer may define one or more test scripts corresponding to user interaction journeys traversing a sequence of applications. The sequence may include a diverse technology stack including user interface, mainframe, and mobile applications. A test execution engine may execute the test scripts to traverse the user interaction journey across the different types of applications in the sequence. The test execution engine identifies applications returning errors and compiles analytical data corresponding to the error. The test execution engine also notifies developers corresponding to the particular application returning the error and generates a graphical user interface for viewing the analytical data. Developers may view the impact of the error on the particular user interaction journey and quickly identify, diagnose, and correct the error.

17 Claims, 6 Drawing Sheets

(56) References Cited

U.S. PATENT DOCUMENTS

| | | | |
|---|---|---|---|
| 2005/0204343 A1* | 9/2005 | Kisamore | G06F 11/3688 717/124 |
| 2006/0206867 A1* | 9/2006 | Parsons | G06F 11/3664 717/124 |
| 2007/0266165 A1* | 11/2007 | Li | G06F 11/3684 709/230 |
| 2011/0307864 A1* | 12/2011 | Grechanik | G06F 11/3696 717/124 |
| 2013/0174117 A1* | 7/2013 | Watters | G06F 8/71 717/106 |
| 2016/0092347 A1* | 3/2016 | Edwards | G06F 11/3684 717/125 |
| 2018/0089068 A1* | 3/2018 | Bhojan | H04W 4/50 |
| 2020/0174917 A1* | 6/2020 | Patel | G06F 8/42 |
| 2020/0364127 A1* | 11/2020 | White | H04L 43/091 |
| 2022/0058112 A1* | 2/2022 | Lim | G06F 11/3684 |
| 2024/0037020 A1 | 2/2024 | Hamid | |

* cited by examiner

VALIDATION AND TESTING OF A SEQUENCE OF MULTIPLE APPLICATIONS

FIELD

This field is generally related to validation of a sequence of software applications across a defined user interaction journey.

RELATED ART

Software applications are commonly implemented to assist users with accessing online content. As the complexity of user desires grows, multiple applications may be involved in achieving a particular user's goal. For example, a user may access multiple applications or pass data between multiple applications to access online content.

While software developers may have individually tested the applications for bugs or errors, new errors may arise when a user attempts to access multiple applications to achieve his or her goals. Similarly, additional errors may arise when data is shared between applications or across multiple applications. Even further, other errors may occur when one of the applications has been updated or an anticipated user input has been changed. Any of these errors may arise and affect one or more applications preventing the user from achieving their desired goal. An error arising in one application may further impact other applications or create additional downstream errors when multiple applications are used in a sequence.

Unit tests are designed to test a particular portion of code, such as a particular function call. These unit tests apply a set of known inputs to the function and check to see whether a desired output is attained. However, testing every possible input combination for every function may be difficult or impossible, particularly when multiple applications need to work together. And, sometimes the unit tests themselves can have bugs.

In another approach, a test may run the application through a user journey. With a user journey test, a test script defines a series of specific steps a user has to perform to accomplish something on a system such as a website. For example, if a user needs to buy ingredients for a spaghetti dinner from a grocery store website, the steps might be: visit the website, add items (like tomatoes, garlic, parmesan cheese, and noodles) to the shopping cart, click on the checkout button.

While user journey testing may be useful, application developers may face difficulty in identifying and analyzing errors from a journey test. This may be especially difficult when multiple applications are accessed by a user to achieve a goal or when the multiple applications are maintained by different teams of application developers. Application developers may face difficulty identifying the particular application returning an error or how such an error impacts other applications accessed by the user in achieving his or her goals.

BRIEF SUMMARY

Disclosed herein are system, apparatus, device, method and/or computer program product embodiments, and/or combinations and sub-combinations thereof, for validation and testing of a sequence of multiple applications. To perform the validation and/or testing of the multiple applications, one or more user interaction journeys may be defined using one or more test scripts. A user interaction journey may reflect a sequence of user actions performed to achieve a particular goal involving the access of multiple applications. The user interaction journey may include front-end graphical user interface (GUI) interactions and/or back-end processing performed to achieve the goal. The user interaction journey may further invoke a sequence of applications and/or be a series of inputs that together create a transaction through the sequence of applications.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
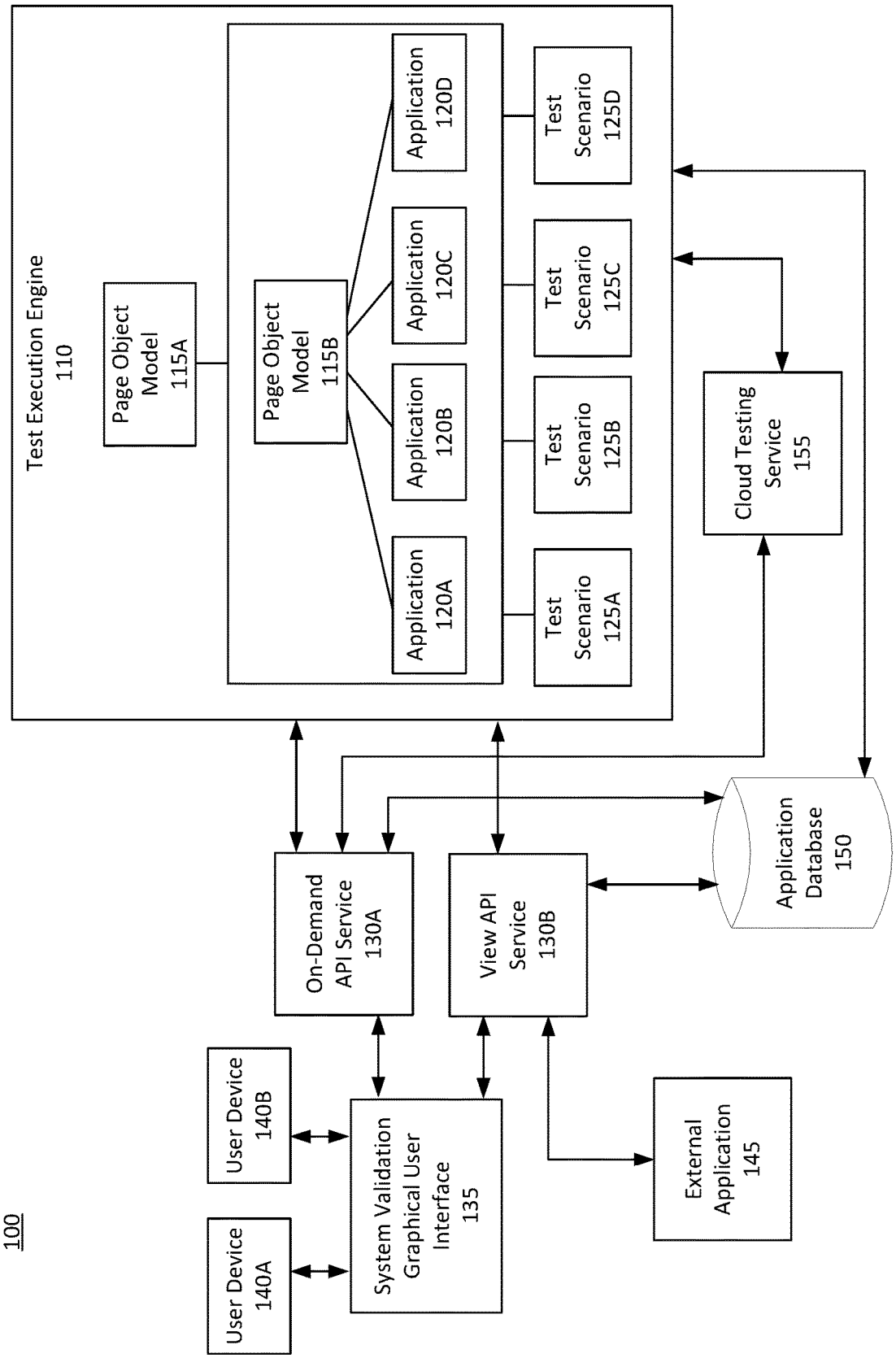
FIG. 1 depicts a block diagram of an application testing environment, according to some embodiments.

Provided herein are system, apparatus, device, method and/or computer program product embodiments, and/or combinations and sub-combinations thereof, for validation and testing of a sequence of multiple applications. A test execution engine may provide a console for an application developer to define one or more user interaction journeys using one or more test scripts. The user interaction journey may reflect a sequence of user actions performed to achieve a particular goal. The user interaction journey may invoke multiple applications or a sequence of applications and/or be a series of inputs that together create a transaction through the sequence of applications.

For example, an example user interaction journey may be for a user to access a user bank account to view balance information on both an online browser portal as well as a mobile device. The particular user journey may include accessing a bank webpage; supplying user credentials on the bank webpage; checking the user credentials on the back-end using an identity management application; performing a two-factor authentication; retrieving the bank account information for display; generating a web browser display including the bank account information; logging out of the bank webpage; accessing a mobile application for the bank; re-supplying user credentials in the mobile application; performing a biometric verification of the user; retrieving the bank account information again; and/or displaying the bank account information within the mobile application. This example user interaction journey may access different types of services and/or applications to perform this sequence of interactions. For example, the retrieval of bank account information may be executed by an application that differs from another application performing two-factor authentication or biometric verification. Further, the mobile application may be a different application relative to the webpage application.

In this manner, both front-end GUI, mobile GUI, and back-end mainframe applications may be implicated for this particular user interaction journey. The test execution engine may account for many different types of applications in a technology stack. For example, the test execution engine may manage different types of cloud-based applications and/or their interaction with other applications. Many other applications and/or user interaction journeys may also occur in practice and be captured using different test scripts. These test scripts may simulate hundreds or thousands of different user interaction journeys through potentially hundreds or thousands of applications. In this manner, developers may test different applications and/or sequences of applications to ensure that user interaction journeys are successfully executed.

To perform this testing, a test execution engine may generate one or more GUIs allowing an application developer or user to define one or more test scripts corresponding to different user interaction journeys to test different applications and/or application interactions. The test execution engine further compiles error and/or failure information and analytics corresponding to application errors. These analytics aid in identifying and diagnosing applications returning errors. The detection of these errors across multiple applications and/or a sequence of applications provides increased accuracy in identifying errors when a user conducts a user interaction journey. Recording the particular application returning an error and/or analytics related to that error may also aid application developers in correcting the application. The test execution engine may further generate a notification message identifying the error and corresponding analytics. The test execution engine may also inform the particular application development team or developers corresponding to the application returning the error. For example, if different teams of developers are responsible for different application, the test execution engine may notify or alert the relevant team to correct the application. This notification may occur in real-time or even if a particular test script is still in the process of executing.

In this manner, the test execution engine may allow developers to build user interaction journeys as test scripts to test multiple applications and/or a sequence of applications. The test execution engine may also allow developers to define a periodicity corresponding to the execution of the one or more test scripts. This periodicity may define a time interval for executing the test scripts. The test execution engine may track errors and/or statistics related to the execution of the test scripts at these intervals. For example, the test execution engine may identify failure alerts and/or statistics related to an amount of time taken to execute a test script. This gathering of statistics and/or error reports may aid application developers in updating, patching, and/or modifying applications for additional efficiency and/or robustness to handle different user interaction journeys.

The test execution engine may also provide a regression process for testing when an application has been updated and/or when an anticipated user input has been changed. For example, if a particular application is updated or patched, the test execution engine may execute the one or more test scripts corresponding to the different user interaction journeys. This testing may determine if any errors arise corresponding to the application that has been updated and/or any other application that may follow the updated application. For example, the updated application may execute the test script with errors but may pass erroneous data to a subsequent application in the sequence of applications for a particular user interaction journey. In this case, the test execution engine may identify the error in the subsequent application and identify how the updated application has impacted other applications used during a user interaction journey. This may allow a regression by informing an application developer of the error, receiving a correction, and then executing the test script again to determine if any other corrections are needed.

Similarly, the regression process may aid when an anticipated user input has been changed. For example, a particular sequence of applications may be utilized to execute payment as part of a transaction. In this example, different applications may be used to receive a credit card number as part of a transaction; access a credit card balance; authorize the charge of the credit card; and/or provide payment to a merchant for executing the transaction. A company may introduce a new credit card or credit card technology, which may affect the application receiving the credit card number. For example, the new credit card may include different limits, restrictions, rewards bonuses, and/or utilize a different back-end process for processing credit card transactions. By utilizing the test scripts and/or defining a new test script corresponding to the new credit card, the multiple applications may be tested to see if the newly introduced input generates any errors with the existing applications. If so, developer teams may be notified to address any potential errors. In this manner, the test execution engine also provides regression in testing these applications in anticipation for new or different inputs.

As previously explained, these processes may increase the efficiency of application testing and aid in accurately detecting errors for multiple applications. This detection may aid developers in diagnosing problems arising during different user interaction journeys across multiple applications. This detection may also aid in efficiently identifying errors when output data of a particular application is used by a subsequent application during a user journey. By accurately identifying errors that arise, developers may more efficiently correct and update applications.

Various embodiments of these features will now be discussed with respect to the corresponding figures.

FIG. 1 depicts a block diagram of an application testing environment 100, according to some embodiments. Application testing environment 100 includes test execution engine 110, user devices 140, system validation graphical user interface (GUI) 135, on-demand API service 130A, view API service 130B, external application 145, application database 150, and/or cloud testing service 155. Test execution engine 110 includes page object models 115A, 115B, applications 120, and/or test scenarios 125.

In some embodiments, test execution engine 110 may be implemented using computer system 600 as further described with reference to FIG. 6. For example, test execution engine 110 may be implemented using one or more servers and/or databases. Test execution engine 110 may interface with a user device 140 to allow an application developer to define one or more test scripts corresponding to one or more user interaction journeys. User device 140 may be one or more desktop, laptop, personal computer, cloud computing server farms, and/or a computer system 600 as described with reference to FIG. 6.

Test execution engine 110 may interface with page object models 115A, 115B, applications 120, test scenarios 125, on-demand API service 130A, view API service 130B, system validation graphical user interface 135, external application 145, application database 150, and/or cloud testing service 155. While these different components and/or services may be depicted separate from test execution engine 110, test execution engine 110 may implement and/or provide these services to interact with user devices 140. For example, test execution engine 110 may use on-demand API service 130A and/or view API service 130B when generating system validation GUI 135. System validation GUI 135 may be generated by test execution engine 110 to be displayed on user device 140. In some embodiments, a user device 140 may interact with test execution engine 110 over the Internet and/or over a cloud computing platform.

User device 140 may access test execution engine 110 via system validation GUI 135. An example of system validation GUI 135 is further described with reference to FIG. 2. System validation GUI 135 may enable communications with test execution engine 110 via on-demand API service 130A and/or view API service 130B. In some embodiments, on-demand API service 130A and/or view API service 130B may use an application framework, such as a Spring application framework from Pivotal Software, Inc. of San Francisco, CA. On-demand API service 130A may allow a user to define one or more test scripts corresponding to a user interaction journey. These test scripts may define test scenarios 125. The test scripts may identify user interactions journeys across multiple applications 120 and/or a sequence of applications 120. For example, the tests scripts may identify the particular applications 120 to test and/or may include a validation criteria for testing the applications. The validation criteria may define a successful output for a respective application. In some embodiments, the output from a particular application 120 may be used as the input to a subsequent application 120 in a user interaction journey. In some embodiments, the test scripts may be defined to include test data. This test data may also be supplied when executing the one or more test scripts. On-demand API service 130A may receive the test scripts and/or test data from a user device 140. Test execution engine 110 may receive the test scripts and/or test data via on-demand API service 130A.

On-demand API service 130A may interface with cloud testing service 155 to execute the test scripts. Test execution engine 110 may use cloud testing service 155 to execute the test scripts corresponding to the user interaction journeys. For example, cloud testing service 155 may execute test scripts corresponding to cloud-based applications. In some embodiments, the cloud testing service 155 may be implemented using an on-demand plugin and/or a continuous integration testing platform. The testing platform may provide a continuous integration and continuous deployment (CI/CD) process or pipeline. In some embodiments, the testing platform may be implemented using a Sauce Labs testing platform from Sauce Labs Inc. of San Francisco, CA to perform testing. The testing platform may also implement a Jenkins plugin to automate testing. Jenkins is an open source automation software.

Cloud testing service 155 may provide continuous integration testing for application 120 development. Cloud testing service 155 may allow for testing of cloud-based applications 120 using the defined test scripts corresponding to user interaction journeys. Cloud testing service 155 may build tools, compile test scripts, and/or link the execution of test scenarios 125 as applied to different applications 120. This may also allow for software validation. When executing test scripts, on-demand API service 130A may also interface with application database 150. Application database 150 may store application data used to execute the test scripts. Application database 150 may be a cloud database. For example, application database 150 may be a Couchbase database or CouchDB. Application database 150 may store application data for cloud-based applications 120. Application database 150 may also store results and/or validate results.

Test execution engine 110 may also include view API service 130B. View API service 130B may provide test results to be viewed on system validation GUI 135. As will be further described below, test execution engine 110 may identify particular applications returning errors upon executing test scripts. These errors may correspond to failures of validation criteria defined by a developer. Test execution engine 110 may identify analytics corresponding to such failures and present these analytics to developer teams to address. Test execution engine 110 may identify the application 120 returning the error and/or analytics and display this data using view API service 130B. View API service 130B may then display the results onto system validation GUI 135. View API service 130B may also generate a notification message to a developer or team of developers indicating that an error has been detected. Using a user device 140, a developer may view the error analytics and/or the indication of the application 120 returning the error within system validation GUI 135.

View API service 130B may also provide onboarding functions for interfacing external applications 145. For example, test execution engine 110 may onboard a REST API service. External applications 145 may include applications external to those applications 120 controlled by test execution engine 110. For example, test execution engine 110 may have more control or permissions for applications 120 relative to external application 145. A developer, however, may still define a user interaction journey and/or test scripts that interact with external application 145. For example, external application 145 may be an application within a sequence of applications 120 that are tested for a particular user interaction journey. In this manner, test execution engine 110 may also perform testing that includes external application 145. View API service 130B may allow a developer to identify external application 145 for onboarding to the testing process. View API service 130B may also store application data relevant to external application 145 in application database 150.

Using these components and/or services, test execution engine 110 may execute one or more test scripts defining user interaction journeys among applications 120 and/or external application 145. For convenience, the description of applications 120 will include potential test scripts also including external application 145. Upon receiving a test script defining a user interaction journey, test execution engine 110 may apply different test scenarios 125 defined by the test script to the different applications 120. In some embodiments, the test scenarios 125 may be applied in a sequence corresponding to the sequence of applications 120 defined in the test script. The execution of this sequence of test scenarios 125 may represent traversal through a defined user interaction journey. If test execution engine 110 encounters an error or failure of a validation criteria defined by a test scenario 125, test execution engine 110 may identify the particular application 120 returning the error and/or gather statistics related to the error. Test execution engine 110 may then notify the developers or team of developers responsible for that application 120.

In some embodiments, test execution engine 110 may automate testing of web-based and/or cloud-based applications 120. To perform this testing, test execution engine 110 may implement a Selenium or Java framework. To automate the testing of applications 120, test execution engine 110 may use page object models 115A, 115B to organize the sequence of applications 120. Page object models 115 may be design patterns used for test automation and/or creating object repositories for web UI elements. For example, page object model 115A may be a parent indicating a sequence of pages. Page object model 115B may be an end-to-end definition defining the sequence of applications 120 to test based on the provided test script.

For example, in some embodiments, applications 120 may also be identified using page object models with different classes. These classes may include a web page class, a desktop page class, a mainframe page class, and/or other types of page classes. For a particular test sequence, application 120A may correspond to a web page class; application 120B may correspond to a desktop page class; application 120C may correspond to a mainframe page class; and application 120D may correspond to a web page class. In this manner, different applications 120 corresponding to different class types may be tested. As previously explained, these different applications may correspond to front-end UI, back-end processing, API, mainframe, mobile native application, and/or mobile device UI as well. Different user interaction journeys may interact with these applications 120 in different ways. Defining multiple different test scripts may allow testing across the applications 120 even when applications 120 have different class types.

To test each of the applications 120 corresponding to a user interaction journey, test execution engine 110 may use test scenarios 125. Test scenarios 125 may include input test data, test commands, functions, methods, and/or validation criteria to evaluate applications 120 while traversing the user interaction journey. For example, when testing a login procedure to view user bank account information, test scenarios 125 may provide designated test login credentials for logging into a web browser and/or a mobile banking application. Test scenarios 125 may also provide test account information such as an account balance. Test scenarios 125 may also provide validation criteria to ensure that the correct account page is reached after a successful login and/or that the matching account balance has been retrieved. A developer using user device 140 may define test scenarios 125 within a test script corresponding to a user interaction journey. For example, the developer may define the test script using code and/or UI objects displayed using system validation GUI 135. In some embodiments, the developer may upload a test script to test execution engine 110 using system validation GUI 135. The developer may also provide a periodicity for executing the test script.

When executing a test script, test execution engine 110 may identify test scenarios 125 and apply them to applications 120 to traverse the user interaction journey. Test execution engine 110 may compare validation criteria defined by the test script to determine whether testing was successful. When testing is successful, test execution engine 110 may then transmit a notification indicating successful execution of the user interaction journey. For example, test execution engine 110 may transmit a notification that appears on system validation GUI 135. In some embodiments, the notification may be an email and/or a notification via a messaging platform or instant messaging platform.

When test execution engine 110 has detected an error returned from an application 120 in response to failing the validation criteria, test execution engine 110 may compile analytical data identifying the error and/or the application 120 returning the error. Test execution engine 110 may then transmit a notification indicating detection of the error. For example, test execution engine 110 may transmit a notification that appears on system validation GUI 135. In some embodiments, the notification may be an email and/or a notification via a messaging platform or instant messaging platform. The notification may include a summary of test results, a high-level description of the failure, test data, a history of previous tests and/or results, the particular failed step within a test scenario 125, and/or one or more screenshots corresponding to the test and/or failure. The screenshots may correspond to webpages and/or GUIs utilized during the test. In some embodiments, the notification may report this information as an HTML-based report. In some embodiments, test execution engine 110 may display this information in system validation GUI 135 for developers or engineers to analyze. In this manner, developers or engineers may quickly respond to failure notifications for troubleshooting or to resolve the errors.

Test execution engine 110 may also track successful testing and/or testing failures when automating the execution of a test script or when manually executing the test script. For example, test execution engine 110 may automatically execute one or more test scripts based on a periodicity defined by a developer specifying the test script. This periodicity may be change by a developer if a different one is desired. Upon periodically executing the test script, test execution engine 110 may record successes and/or failures and report this information back to the developer. In some embodiments, the developer may view these success and/or failure information using system validation GUI 135.

In some embodiments, test execution engine 110 may also allow a user to manually step through a test script using system validation GUI 135. For example, after a user has defined a potential test script indicating a sequence of applications 120 to test, system validation GUI 135 may include a UI object allowing a user to step through each test scenario 125 and/or function or command within a test scenario 125 of the sequence. The user may manually select to proceed to the next function, command, and/or test scenario 125 and visually identify that a particular step has succeeded or failed. In this manner, a developer may manually test a test script to identify successful execution of a particular user interaction journey through applications 120. The developer may then automate this process to run automatically at a designated periodicity. For example, the script may be run once a day or once every two hours. Test execution engine 110 may store multiple defined user interaction journey scripts to test different application 120 interactions and to ensure that end users do not experience errors or bugs.

By executing test scripts and/or user interaction journeys, test execution engine 110 may provide a continuous integration and continuous deployment (CI/CD) process or pipeline. For example, when code changes to a particular application 120 are deployed to a testing environment, test execution engine 110 may execute stored test scripts to see how particular user interaction journeys may be impacted by changed code. Test execution engine 110 may track successes and failures in response to executing the test scripts as applied to the new or updated applications 120. In this manner, test execution engine 110 may more quickly identify errors that may arise when new or updated applications 120 are implemented. This may aid developers in quickly identifying and/or patching errors which may impact subsequent applications 120 used in a particular user interaction journey. By defining a suite of user interaction journeys for testing, test execution engine 110 may streamline a CI/CD pipeline which may include multiple and/or sequential applications 120.

Figure 2:
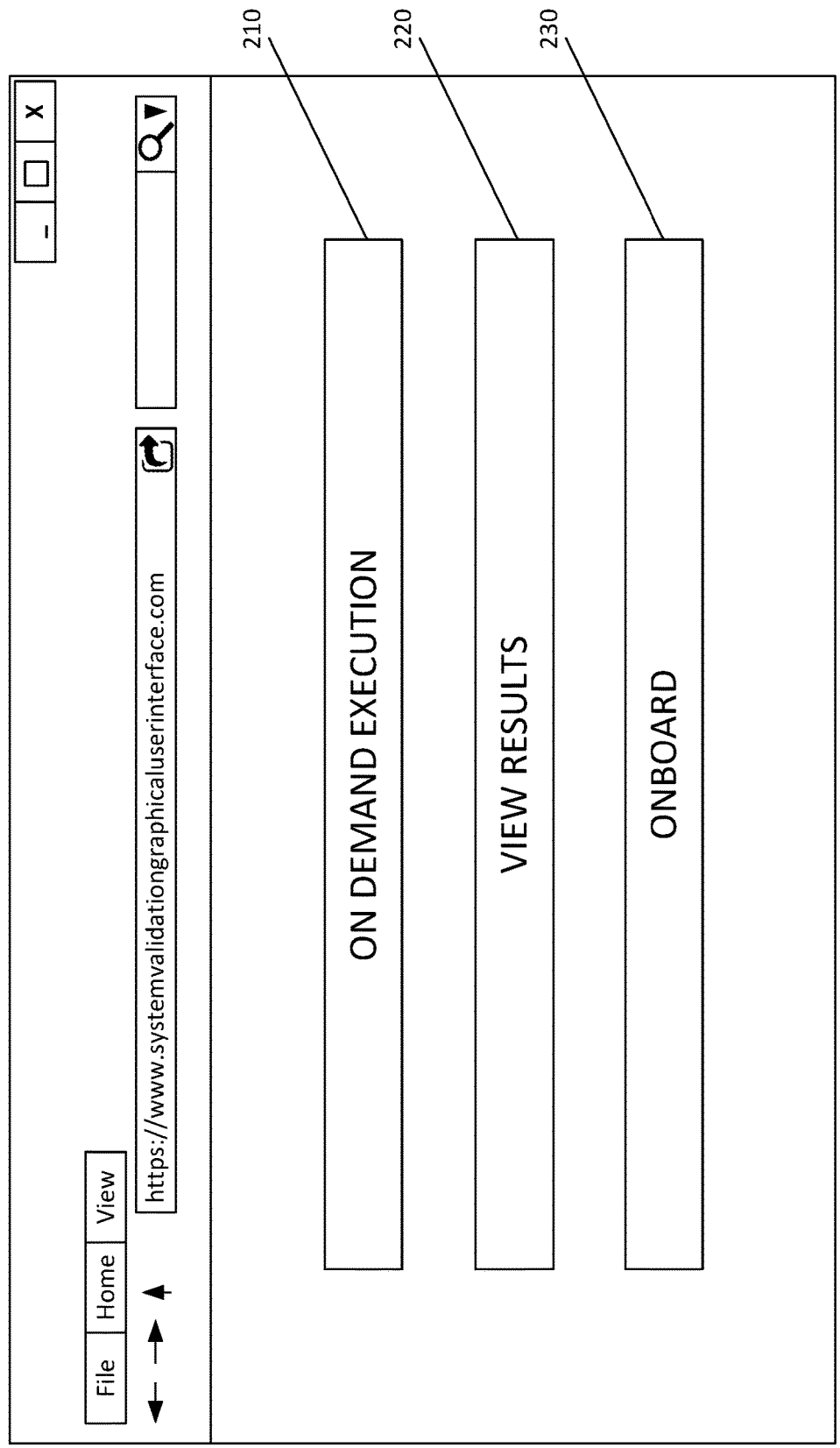
FIG. 2 depicts a block diagram of a graphical user interface for application test sequences, according to some embodiments.

FIG. 2 depicts a block diagram of a graphical user interface (GUI) 200 for application test sequences, according to some embodiments. GUI 200 may include a test script GUI object 210, a test result GUI object 220, and/or an onboarding GUI object 230. GUI 200 may be generated by test execution engine 110. GUI 200 may be an example embodiment of system validation GUI 135. User device 140 may access and/or display GUI 200. In some embodiments, user device 140 may interface with test execution engine 110 via on-demand API service 130 and/or view API service 130B to generate GUI 200. User device 140 may access GUI 200 via an online portal corresponding to test execution engine 110.

A developer may interact with GUI 200 to define one or more test scripts corresponding to user interaction journeys, view and/or analyze test results, and/or designate external applications 145 for inclusion in user interaction journeys. Using GUI 200, a developer may interact with data objects 210, 220, and/or 230 to access additional GUIs and/or pages generated by test execution engine 110. For example, when a developer selects test script GUI object 210, the developer may define one or more test scripts corresponding to user interaction journeys. The test scripts may identify one or more applications, a sequence of applications, multiple sequences of applications, test data to supply to particular applications, and/or validation criteria for comparing the results output by the applications.

The developer may define a test script using additional GUIs and/or pages generated by test execution engine 110. In some embodiments, test execution engine 110 may include text boxes and/or other GUI objects that a user may utilize to define a test script. For example, test execution engine 110 may provide GUI objects corresponding to different applications for selection. Test execution engine 110 may generate an interface on the GUI allowing a developer to define the test script, the validation criteria, and/or the sequence of applications. A developer may provide code designating commands, functions, and/or test data in a text box and/or console. For example, test execution engine 110 may provide a console for in-line test script drafting. The developer may then provide a selection and/or input text defining test script elements, the validation criteria, and/or the sequence of applications. In some embodiments, a developer may upload test scripts locally stored on a user device 140.

In some embodiments, selecting test script GUI object 210 may also allow a user to view the journey as an execution of the test script. For example, the user may step through the process defined in the test script to view execution of the user interaction journey. The user may then identify any potential errors manually. The user may later designate the automatic execution of the test script.

A developer may also select test result GUI object 220 to view test results corresponding to executed tests. The test results may include successes and/or errors resulting from the execution of a test script. After being notified that an error has been detected, a developer may interact with GUI object 220 to view the analytics and/or statistics gathered corresponding to the identified error. For example, the test results may identify the application returning an error. In some embodiments, the test results may include a high-level description of the failure, test data, a history of previous tests and/or results, the particular failed step within a test scenario 125, and/or one or more screenshots corresponding to the test and/or failure. The screenshots may correspond to webpages and/or GUIs utilized during the test. By interacting with test result GUI object 220, a developer may view the result and/or screenshots. The reporting of the results and/or screenshots may be presented as an HTML-based report.

In some embodiments, when interacting with test result GUI object 220, the developer may view the completion status and/or failure status for one or more test scripts. This may be viewed when tests scripts have been executed and/or during the execution of tests scripts For example, if a plurality of test scripts have been applied and are in the process of being executed by applications 120, the developer may view which test scripts have completed successfully, have returned errors, and/or are still in progress for execution. In this manner, the developer may track the real-time status of a particular failure status. Additionally, even if a particular test script returns a failure, the other test scripts may still be executed and/or be successfully completed. The developer may view this status using test result GUI object 220.

A developer may select onboarding GUI object 230 to access onboarding functions for interfacing external applications. For example, view API service 130B may provide onboarding functions for a REST API service. The developer may specify external applications to include in the execution of test scripts for multiple applications and/or a sequence of applications.

Figure 3:
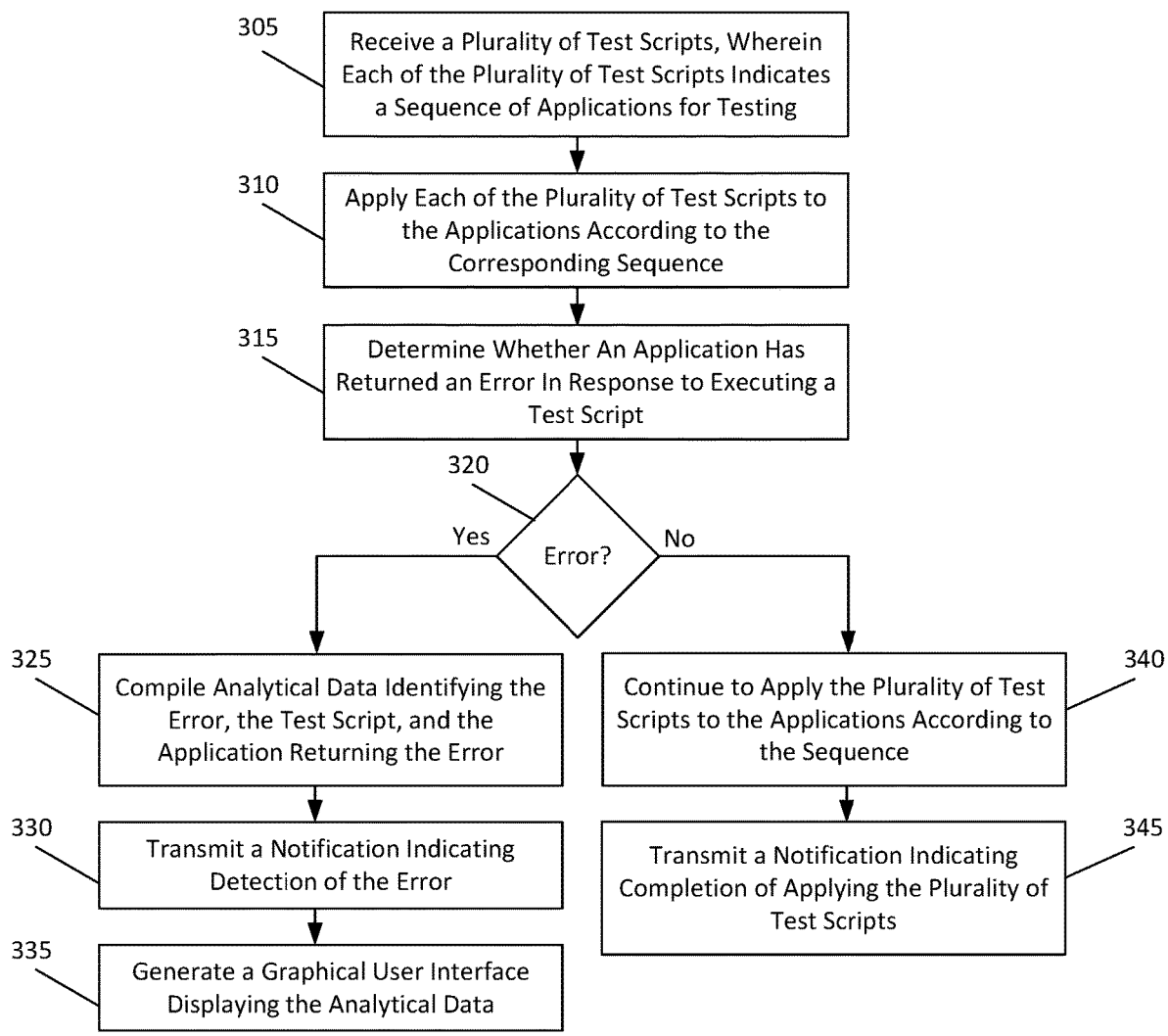
FIG. 3 depicts a flowchart illustrating a method for executing a plurality of test scripts, according to some embodiments.
Figure 4:
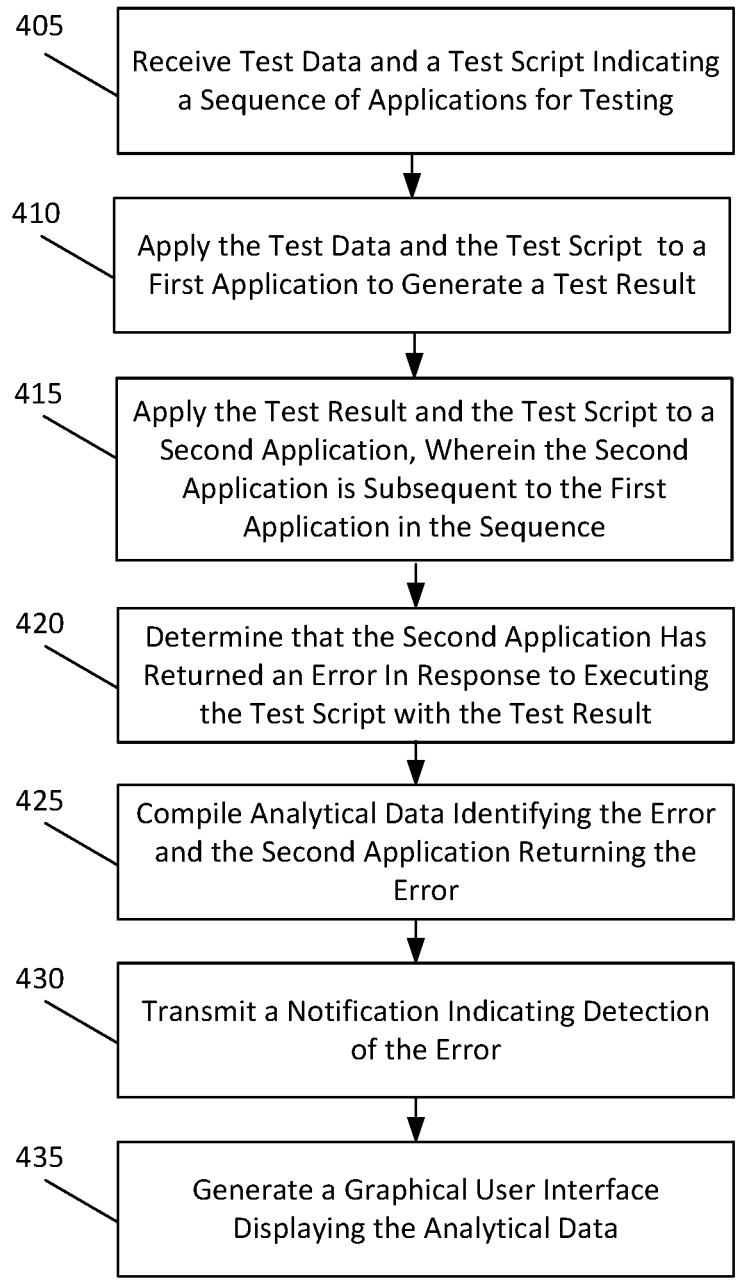
FIG. 4 depicts a flowchart illustrating a method for executing a test script with test data, according to some embodiments.
Figure 5:
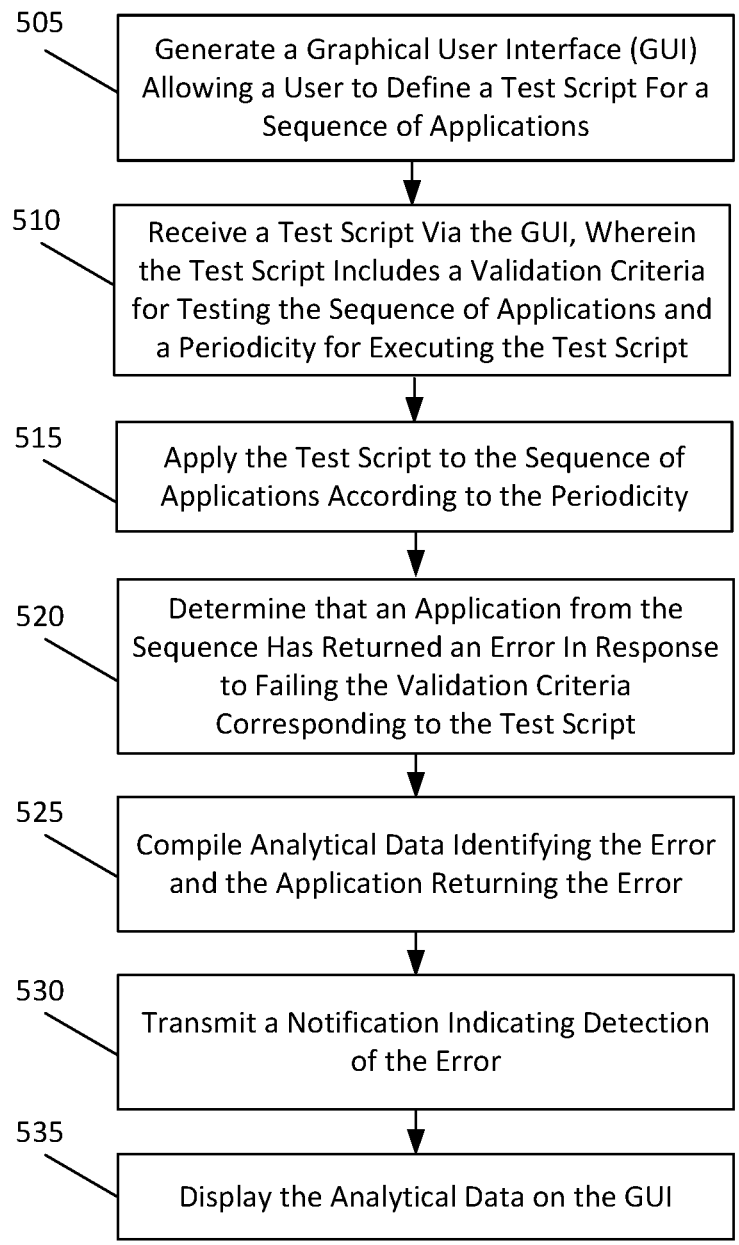
FIG. 5 depicts a flowchart illustrating a method for defining a periodic execution of a test script, according to some embodiments.

FIGS. 3-5 below describe methods for executing and defining test scripts corresponding to user interaction journeys. As previously explained, a user interaction journey may test multiple applications to determine if a user would successfully be able to interact with the multiple applications to achieve a particular goal. For example, a particular user interaction journey may involve navigating to an online store via a web browser; providing login credentials for the online store; adding an item to a shopping cart; navigating away from the online store; opening a mobile application corresponding to the online store; identifying the item as still being present in the shopping cart; and completing the transaction using a payment method corresponding to the user account. Another user interaction journey may test wish list functionality allowing a user or multiple users to collaborate and select items from an online store and to add them to a shared wish list. Even further, another user interaction journey may be an addition to a gift card balance via the entry of a gift card number and confirming that back-end crediting has successfully completed. FIGS. 3-5 will be described with reference to these user interaction journeys but are not limited solely to these examples.

FIG. 3 depicts a flowchart illustrating a method 300 for executing a plurality of test scripts, according to some embodiments. Method 300 shall be described with reference to FIG. 1; however, method 300 is not limited to that example embodiment.

In an embodiment, test execution engine 110 may utilize method 300 to execute a plurality of test scripts corresponding to different user interaction journeys. The foregoing description will describe an embodiment of the execution of method 300 with respect to test execution engine 110. While method 300 is described with reference to test execution engine 110, method 300 may be executed on any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 305, test execution engine 110 may receive a plurality of test scripts, wherein each of the plurality of test scripts indicates a sequence of applications 120 for testing. As previously explained with reference to FIGS. 1 and 2, test execution engine 110 may receive the test scripts via system validation GUI 135 and/or GUI 200. A developer may identify the test scripts. The test scripts may correspond to different user interaction journeys across applications 120. The different user interaction journeys may apply and/or utilize different or overlapping applications 120. A particular test script may specify the sequence of relevant applications 120 for testing a particular user interaction journey. Upon receiving the plurality of test scripts, test execution engine 110 may store the test scripts in memory or in a database. Test execution engine 110 may then generate a suite of test scripts to apply. For example, the plurality of test scripts may reflect different user interaction journeys corresponding to an online store as described above.

At 310, test execution engine 110 may apply each of the plurality of test scripts to the applications 120 according to the corresponding sequence. In some embodiments, test execution engine 110 may apply the test scripts sequentially based on an ordering of the test scripts. In some embodiments, test execution engine 110 may apply multiple test scripts in parallel. This may occur, for example, when different test scripts include different applications 120. Test execution engine 110 may apply a particular test script based on the particular ordering of applications specified within the test script. By applying a test script, test execution engine 110 may traverse a defined user interaction journey corresponding to the test script.

At 315, test execution engine 110 may determine whether an application 120 has returned an error in response to executing a test script. Test execution engine 110 may determine that a particular application 120 has failed a validation criteria corresponding to the test script. For example, the application 120 may fail the validation criteria corresponding to a particular test scenario 125 corresponding to the application. The failure may be detected when an application 120 encounters a runtime error and/or returns unexpected output data. For example, this output data may not match a defined validation criteria defined by the test script. In some embodiments, the output data may by data utilized by a subsequent application in the sequence. In this case, the return of erroneous output data may generate additional downstream errors. In some embodiments, the validation criteria may identify a particular GUI and/or page to be displayed by application 120. An error may indicate the failure to access and/or display the expected GUI and/or page. An error may also be identified when a display object or element of the GUI and/or page is not correctly displayed. For example, the display object or element may differ from one that is expected based on the validation criteria. Regarding the online store examples described above, errors may include seeing that an item added to an online shopping cart does not appear in a mobile application, identifying errors in items added to a wish list, and/or identifying an error with crediting a gift card balance.

At 320, test execution engine 110 may determine whether an error has occurred. The determination of an error may occur and/or be detected for any of the plurality of test scripts being applied. For example, some test scripts may execute without returning errors. Some test scripts may return errors, which may be detected at 320.

When test execution engine 110 detects an error, at 325, test execution engine 110 may compile analytical data identifying the error, the test script, and/or the application returning the error. For example, when test execution engine 110 applies the plurality of test scripts, test execution engine 110 may identify the particular test script that returns the error. The test execution engine 110 may also identify the application 120 returning the error. In some embodiments, test execution engine 110 may also identify a particular command and/or function returning the error at test execution engine 110. As previously explained, the error may be a runtime error and/or an erroneous output generated by the application 120. The error may be detected based on a failure to meet the validation criteria defined in the test script. When compiling analytical data, test execution engine 110 may generate a summary of test results, a high-level description of the failure, test data, a history of previous tests and/or results, the particular failed step within a test scenario 125, and/or one or more screenshots corresponding to the test and/or failure. The screenshots may correspond to webpages and/or GUIs utilized during the test. For example, the screenshots may be of the displays generated by the particular application 120 returning the error. Test execution engine 110 may compile the analytical data for the error into an HTML-based report.

For example, the analytical data may provide screenshots of a web browser or mobile application returning an error in the online store example described above. Similarly, the analytical data may also identify the particular component or service returning the error, such as the front-end GUI or back-end processing to perform the intent user actions.

At 330, test execution engine 110 may transmit a notification indicating detection of the error. For example, test execution engine 110 may transmit a notification that appears on system validation GUI 135. The notification may be an email and/or a notification via a messaging platform or instant messaging platform. In some embodiments, the notification may include the compiled analytical data corresponding to the error. In some embodiments, the notification may include a link and/or instructions to access a portal generated by test execution engine 110 to view the analytical data. For example, the notification may provide a link to view system validation GUI 135 and/or GUI 200. In some embodiments, the notification may instruct a developer to access view system validation GUI 135 and/or GUI 200. The notification may be a real-time notification that may be transmitted upon detection of the error. For example, this may occur even while the test script returning the error and/or other test scripts from the plurality are still executing.

When generating the notification, test execution engine 110 may access a stored list of users corresponding to the particular application 120 returning the error. The users on this list may be the users designated to receive the notification. For example, the list of users may correspond to the developers for a particular application 120. In this case, when test execution engine 110 detects an error corresponding to that particular application 120, test execution engine 110 may inform the relevant team so that the team can correct the error. The users in the list may identified using system validation GUI 135 when a developer is defining a test script. The developer may also designate the users corresponding to each application 120 to be informed if an error is detected. The notification may be an email and/or message in an instant message platform directed to the users of the team corresponding to the application that has returned the error.

At 335, test execution engine 110 may generate a graphical user interface displaying the analytical data. For example, test execution engine 110 may generate system validation GUI 135 and/or GUI 200. An alerted user may then view the analytical data and correct and problems identified in the particular application returning the error.

Returning to 320, if a test script has successfully executed without returning an error, test execution engine 110 may continue to apply the plurality of test scripts to the applications 120 according to the sequence at 340. For example, the other plurality of test scripts may identify the same sequence of applications 120 but provide different test data or commands; identify a different sequence of applications 120; and/or identify some overlapping applications 120 which may or may not also include overlapping test data or commands. If any additional test scripts return an error, test execution engine 110 may execute 325, 330, and 335 to identify the error. If no errors are detected, test execution engine 110 may proceed to 345.

At 345, test execution engine 110 may transmit a notification indicating completion of applying the plurality of test scripts. In some embodiments, test execution engine 110 may transmit a notification as each test script is completed or when the plurality of test scripts has completed. In some embodiments, test execution engine 110 may log the completion of a test script. In this manner, a developer may view the completion status using system validation GUI 135. The developer may view this completion status for a particular test script while other test scripts are continuing to execute. As previously described with reference to test result GUI object 220, a developer may view the completion status for each of the plurality of test scripts using system validation GUI 135 and/or GUI 200. For example, the completion status may indicate whether a particular test script has successfully completed, has returned an error, and/or is still in the process of executing. In this manner, the developer may view the completion status in real-time as the plurality of test scripts are executed.

FIG. 4 depicts a flowchart illustrating a method 400 for executing a test script with test data, according to some embodiments. Method 400 shall be described with reference to FIG. 1; however, method 400 is not limited to that example embodiment.

In an embodiment, test execution engine 110 may utilize method 400 to execute a test script using received test data. The test script and/or test data may correspond to a particular user interaction journey which may use the test data. The foregoing description will describe an embodiment of the execution of method 400 with respect to test execution engine 110. While method 400 is described with reference to test execution engine 110, method 400 may be executed on any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 405, test execution engine 110 may receive test data and a test script indicating a sequence of applications for testing. As explained with reference to FIG. 1, test execution engine 110 may receive the test data and/or the test script via a user device 140 accessing system validation GUI 135. The test script may correspond to a user interaction journey. In some embodiments, the test data may be data supplied within the test script. For example, the test data may include values and/or values defined within the test script. In some embodiments, the test data may include separate files and/or links to data separate from the test script. For example, the developer may upload the test data to test execution engine 110. This test data may be used by one or more the applications 120 indicated the applications indicated in the test script. For example, the test data may be used by an application 120 to generate an output result. This output result may then be compared with validation criteria to determine whether the application has successfully executed the test script. This output result may also be applied to a subsequent application 120 in a sequence identified by the test script.

At 410, test execution engine 110 may apply the test data and the test script to a first application 120A to generate a test result. This test result may correspond to output data used by a subsequent application 120. For example, the result may be generated based on a web-function. In some embodiments, an application may use test data to retrieve the test result from a data repository. For example, the test data may include test user credentials which may be used to access user data at the application 120A.

At 415, test execution engine 110 may apply the test result and the test script to a second application 120B, wherein the second application 120B is subsequent to the first application in a sequence. Using the test result, the second application 120B may perform further processing as identified by the test script.

At 420, test execution engine 110 may determine that the second application 120B has returned an error in response to executing the test script with the test result. In this case, the test result may be identified as erroneous and/or the second application 120B has incorrectly applied the test result. Test execution system 110 may identify this error based on validation criteria defined in the test script.

At 425, test execution engine 110 may compile analytical data identifying the error and the second application 120B returning the error. This analytical data may include the analytical data previous described. For example, test execution engine 110 may compile the analytical in the manner described with reference to 325 in FIG. 3. In some embodiments, test execution engine 110 may also identify the first application 120A as potentially providing an erroneous test result. By compiling this data, a developer may then review the analytical data to determine the cause of the error. The cause may correspond to either the first application 120A and/or the second application 120B.

At 430, test execution engine 110 may transmit a notification indicating detection of the error. This may occur in a manner similar to that described with reference to 330 in FIG. 3. At 435, test execution engine 110 may generate a graphical user interface displaying the analytical data. This may occur in a manner similar to that described with reference to 335 in FIG. 3.

To provide an example, method 400 may be applied to the online shopping example described above. In the online shopping example, the test data may include login credentials, user search queries, predefined user selections or navigation actions, and/or other data used in traversing the user interaction journey. In some embodiments, the test data may be a search query representing an item desired by the user as well as user profile and/or preference information. The test result may be the retrieved search results corresponding to the search query and the user profile and/or preference information. These test results may correspond to validation criteria defined in the test script. The test results may be applied to the second application. For example, the second application may include a wish list application allowing a user to add the identified item to another user's wish list. In this case, there may be an error with adding the desired item to the other user's wish list. In this case, test execution engine 110 may compile analytical data identifying the error and the second application returning the error. Test execution engine may then transmit a notification and generate a GUI displaying the analytical data.

FIG. 5 depicts a flowchart illustrating a method 500 for defining a periodic execution of a test script, according to some embodiments. Method 500 shall be described with reference to FIG. 1; however, method 500 is not limited to that example embodiment.

In an embodiment, test execution engine 110 may utilize method 500 to define a test script corresponding to a particular user interaction journey. The test script may also be defined with a particular periodicity for execution. The foregoing description will describe an embodiment of the execution of method 500 with respect to test execution engine 110. While method 500 is described with reference to test execution engine 110, method 500 may be executed on any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 5, as will be understood by a person of ordinary skill in the art.

At 505, test execution engine 110 may generate graphical user interface (GUI) allowing a user to define a test script for a sequence of applications. This GUI may be system validation GUI 135 as described with reference to FIG. 1 and/or GUI 200 as described with reference to FIG. 2.

At 510, test execution engine 110 may receive a test script via the GUI, wherein the test script includes a validation criteria for testing the sequence of applications 120 and a periodicity for executing the test script. As previously explained, the test script may be defined using a console provided by system validation GUI 135 and/or GUI 200. In some embodiments, a developer may upload a test script generated locally on user device 140. The test script may correspond to a user interaction journey through the sequence of applications 120. Using system validation GUI 135 and/or GUI 200, the developer may also specify a periodicity for executing the test script. This periodicity may indicate a time interval for repeatedly executing the test script. For example, the developer may automate the test script to run automatically at the designated periodicity. For example, the script may be executed once a day or once every two hours.

In some embodiments, the periodicity may not be a specific time interval but may be a designation of specific times for executing the test script. For example, the periodicity may be configured to execute the test script at midnight, 9:00 AM, noon, and 5:00 PM.

At 515, test execution engine 110 may apply the test script to the sequence of applications 120 according to the periodicity. For example, if the periodicity is once every two hours, test execution engine 110 may apply the test script, determine whether the test script has completed successfully or returned an error, wait for two hours, and then execute the test script again.

At 520, test execution engine 110 may determine that an application 120 from the sequence has returned an error in response to failing the validation criteria corresponding to the test script. This may occur as described with reference to FIGS. 1 and 315 and 320 of FIG. 3.

At 525, test execution engine 110 may compile analytical data identifying the error and the application 120 returning the error. This may occur in a manner similar to that described with reference to 325 in FIG. 3. When periodically applying the test script, test execution engine 110 may also track repeated success and/or errors in the execution of the test script. For example, test execution engine 110 may log errors and/or a timestamp corresponding to execution iterations returning an error. A developer may then view the recorded success or errors using system validation GUI 135 and/or GUI 200 to determine whether a pattern exists for diagnosing the errors.

At 530, test execution engine 110 may transmit a notification indicating detection of the error. This may occur in a manner similar to that described with reference to 330 in FIG. 3. At 535, test execution engine 110 may display the analytical data on the GUI. This may occur in a manner similar to that described with reference to 335 in FIG. 3. The GUI may be system validation GUI 135 and/or GUI 200.

To provide an example, method 500 may be applied to the online shopping example described above. In this case, a developer or administrator of the online shopping platform may use the GUI generated by test execution engine 110 to define a test script for execution at a sequence of applications. The developer may also define validation criteria for each application of the sequence of applications and/or a periodicity for executing the test script. The test script may reflect a user interaction journey corresponding to the online shopping platform described above. Test execution engine 110 may then apply the test script according to the periodicity and identify any errors. Test execution engine 110 may then compile analytical data identifying the error and the application returning the errors, transmit a notification, and display the analytical data on the GUI.

Figure 6:
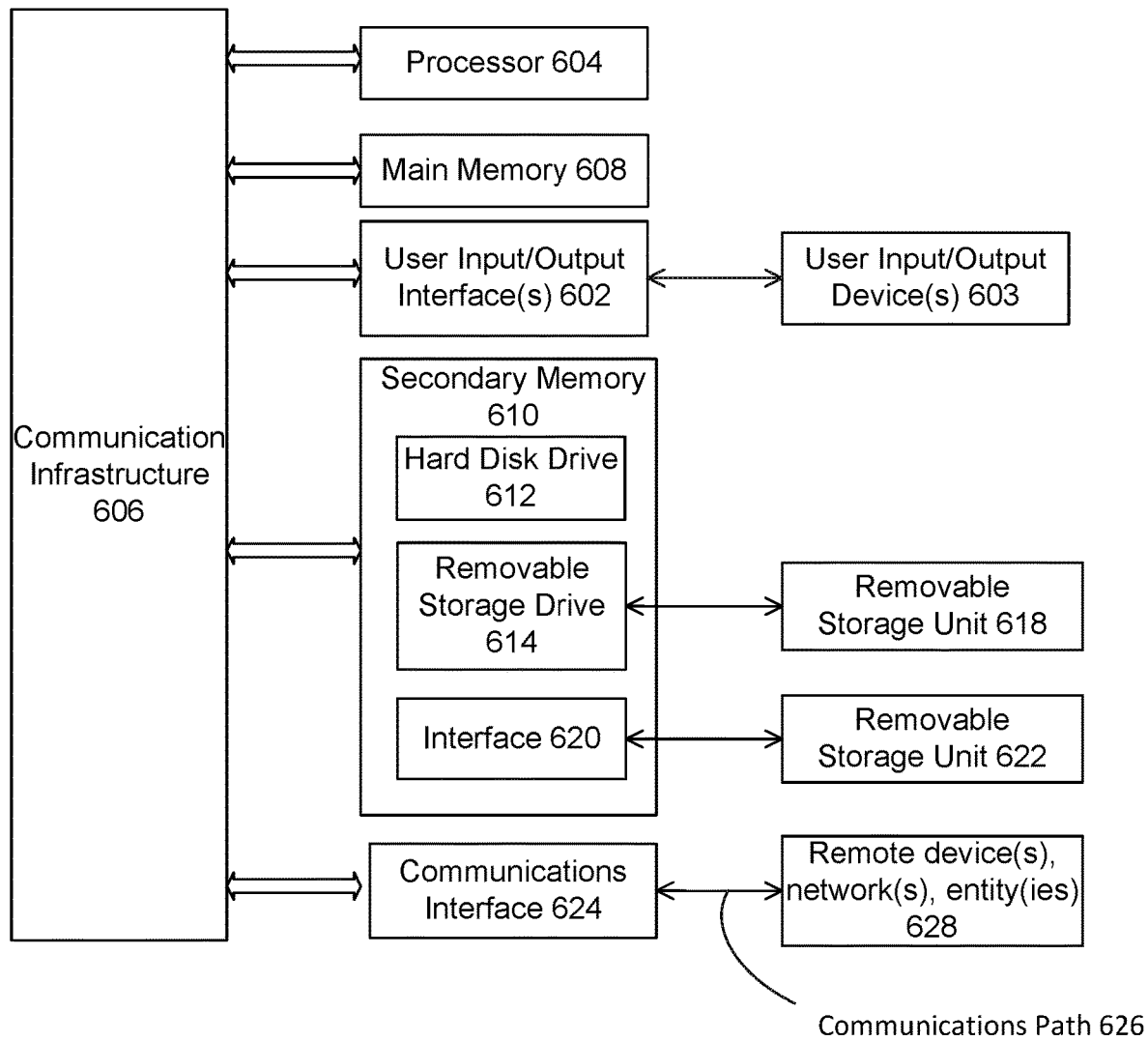
FIG. 6 depicts an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
generating a graphical user interface (GUI) allowing a user to define a test script for a sequence of applications, wherein the test script represents a user interaction journey through the sequence of applications;
receiving the test script via the GUI, wherein the test script includes a validation criteria for testing the sequence of applications that defines a successful output for respective applications in the sequence when the test script is executed by the respective applications;
applying the test script to the sequence of applications to traverse the user interaction journey, wherein the sequence of applications comprises an application of a first class and an application of a second class, wherein the test script defines one or more a plurality of test scenarios corresponding to the sequence of applications, wherein the one or more plurality of test scenarios comprises a first test scenario corresponding to the application of the first class and a second test scenario corresponding to the application of the second class, wherein the one or more test scenarios comprise the validation criteria and execution information for navigating the sequence of applications, and wherein applying the test script to the sequence of applications comprises:
applying, in sequence, the one or more test scenarios for corresponding applications in the sequence of applications, wherein execution information of the first test scenario is applied to the application of the first class and execution information of the second test scenario is applied to the application of the second class; and
validating, based on the validation criteria, a test scenario of the one or more test scenarios with a corresponding application in the sequence of applications;
determining that an application from the sequence has returned an error in response to failing the validation criteria corresponding to the test script based on the validation of the test scenario;
compiling analytical data identifying the error and the application returning the error;
transmitting a notification indicating detection of the error;
displaying the analytical data on the GUI;
receiving test data with the test script via the GUI;
applying the test data and the test script to a first application of the sequence of applications to generate a test result;
applying the test result and the test script to a second application of the sequence of applications, wherein the second application is subsequent to the first application in the sequence;
determining that the second application has returned the error in response to executing the test script with the test result; and
identifying the second application when compiling the analytical data.

2. The computer implemented method of claim 1, wherein the application of the first class and the application of the second class comprises at least one of a web page class, a desktop page class, or a mainframe page class.

3. The computer implemented method of claim 1, wherein receiving the test script via the GUI further comprises:
displaying an interface on the GUI allowing the user to define the test script, the validation criteria, and the sequence of applications; and
receiving a user selection of test script elements, the validation criteria, and the sequence of applications.

4. The computer implemented method of claim 1, wherein displaying the analytical data further comprises:
displaying a screenshot of the application that has returned the error in an HTML-based report.

5. The computer implemented method of claim 1, further comprising:
receiving a periodicity for periodically executing the test script; and
applying the test script to the sequence of applications according to the periodicity.

6. The computer implemented method of claim 1, wherein the notification is an email to a user on a team corresponding to the application that has returned the error.

7. The computer implemented method of claim 1, wherein the notification is a message in an instant message platform directed to a user on a team corresponding to the application that has returned the error.

8. A system, comprising:
a memory; and
at least one processor coupled to the memory and configured to:
generate a graphical user interface (GUI) allowing a user to define a test script for a sequence of applications, wherein the test script represents a user interaction journey through the sequence of applications;
receive the test script via the GUI, wherein the test script includes a validation criteria for testing the sequence of applications that defines a successful output for respective applications in the sequence when the test script is executed by the respective applications;
apply the test script to the sequence of applications to traverse the user interaction journey, wherein the sequence of applications comprises an application of a first class and an application of a second class, wherein the test script defines one or more test scenarios corresponding to the sequence of applications, wherein the one or more test scenarios comprises a first test scenario corresponding to the application of the first class and a second test scenario corresponding to the application of the second class, wherein the one or more test scenarios comprise the validation criteria and execution information for navigating the sequence of applications, and wherein applying the test script to the sequence of applications comprises:
  applying, in sequence, the one or more test scenarios for corresponding applications in the sequence of applications, wherein execution information of the first test scenario is applied to the application of the first class and execution information of the second test scenario is applied to the application of the second class; and
  validating, based on the validation criteria, a test scenario of the one or more test scenarios with a corresponding application in the sequence of applications;
determine that an application from the sequence has returned an error in response to failing the validation criteria corresponding to the test script based on the validation of the test scenario;
compile analytical data identifying the error and the application returning the error;
transmit a notification indicating detection of the error;
display the analytical data on the GUI;
receive test data with the test script via the GUI;
apply the test data and the test script to a first application of the sequence of applications to generate a test result;
apply the test result and the test script to a second application of the sequence of applications, wherein the second application is subsequent to the first application in the sequence;
determine that the second application has returned the error in response to executing the test script with the test result; and
identify the second application when compiling the analytical data.

9. The system of claim 8, wherein the application of the first class and the application of the second class comprises at least one of a web page class, a desktop page class, or a mainframe page class.

10. The system of claim 8, wherein to receive the test script via the GUI, the at least one processor is further configured to:
  display an interface on the GUI allowing the user to define the test script, the validation criteria, and the sequence of applications; and
  receive a user selection of test script elements, the validation criteria, and the sequence of applications.

11. The system of claim 8, wherein to display the analytical data, the at least one processor is further configured to:
  display a screenshot of the application that has returned the error in an HTML-based report.

12. The system of claim 8, wherein the at least one processor is further configured to:
  receive a periodicity for periodically executing the test script; and
  apply the test script to the sequence of applications according to the periodicity.

13. The system of claim 8, wherein the notification is an email to a user on a team corresponding to the application that has returned the error.

14. The system of claim 8, wherein the notification is a message in a third-party application directed to a user on a team corresponding to the application that has returned the error.

15. A non-transitory computer-readable device having instructions stored thereon that, when executed by at least one computing device, cause the at least one computing device to perform operations comprising:
  generating a graphical user interface (GUI) allowing a user to define a test script for a sequence of applications, wherein the test script represents a user interaction journey through the sequence of applications;
  receiving the test script via the GUI, wherein the test script includes a validation criteria for testing the sequence of applications that defines a successful output for respective applications in the sequence when the test script is executed by the respective applications;
  applying the test script to the sequence of applications to traverse the user interaction journey, wherein the sequence of applications comprises an application of a first class and an application of a second class, wherein the test script defines one or more test scenarios corresponding to the sequence of applications, wherein the one or more test scenarios comprises a first test scenario corresponding to the application of the first class and a second test scenario corresponding to the application of the second class, wherein the one or more test scenarios comprise the validation criteria and execution information for navigating the sequence of applications, and wherein applying the test script to the sequence of applications comprises:
    applying, in sequence, the one or more test scenarios for corresponding applications in the sequence of applications, wherein execution information of the first test scenario is applied to the application of the first class and execution information of the second test scenario is applied to the application of the second class; and
    validating, based on the validation criteria, a test scenario of the one or more test scenarios with a corresponding application in the sequence of applications;
  determining that an application from the sequence has returned an error in response to failing the validation criteria corresponding to the test script based on the validation of the test scenario;
  compiling analytical data identifying the error and the application returning the error;
  transmitting a notification indicating detection of the error;
  displaying the analytical data on the GUI;
  receiving test data with the test script via the GUI;
  applying the test data and the test script to a first application of the sequence of applications to generate a test result;
  applying the test result and the test script to a second application of the sequence of applications, wherein the second application is subsequent to the first application in the sequence;
  determining that the second application has returned the error in response to executing the test script with the test result; and
  identifying the second application when compiling the analytical data.

16. The non-transitory computer-readable device of claim 15, wherein the application of the first class and the application of the second class comprises at least one of a web page class, a desktop page class, or a mainframe page class.

17. The non-transitory computer-readable device of claim 15, wherein the operations further comprise:
  receiving a periodicity for periodically executing the test script; and applying the test script to the sequence of applications according to the periodicity.

* * * * *

UNITED STATES PATENT AND TRADEMARK OFFICE
CERTIFICATE OF CORRECTION

Page 1 of 1

PATENT NO. : 12,298,889 B1
APPLICATION NO. : 17/521995
DATED : May 13, 2025
INVENTOR(S) : Toal et al.

It is certified that error appears in the above-identified patent and that said Letters Patent is hereby corrected as shown below:

In the Claims

In Column 19, Claim 1, Line 36, after "more" delete "a plurality of".

In Column 19, Claim 1, Line 38, after "more" delete "plurality of".

Signed and Sealed this
Fifteenth Day of July, 2025

Coke Morgan Stewart
*Acting Director of the United States Patent and Trademark Office*